United States Patent Office 2,786,746
Patented Mar. 26, 1957

2,786,746

METHOD OF ACIDULATING PHOSPHATE ROCKS AND REACTION-PROMOTING AGENTS THEREFOR

Abraham Goldhaar, Los Angeles, Calif., assignor to Universal Detergents, Inc., Fort Worth, Tex., a corporation of Delaware No Drawing. Application October 9, 1953,
Serial No. 385,277

3 Claims. (Cl. 71—40)

This invention is directed to improvements in methods of acidulating phosphate rock whereby by formation of readily soluble and available phosphoric acid compounds is expedited and increased and many operating, economic and physical benefits attained.

The conversion of insoluble tricalcium phosphate into a readily soluble phosphate salt by acidulation of bone and phosphate rock, has been known for many years, and such conversion has been extensively used in the preparation of superphosphate fertilizers from various forms of phosphate rock. The demand of agriculture for superphosphate is growing with extreme rapidity and existing plants are incapable of meeting the demand. The inability to meet the demand is due, in large part, to the fact that present methods are time-consuming and burdensome in that the acid-treated phosphate rock tends to stick to the walls of the dens and excavators used, the reaction rate is slow and the material must be cured for two to eight weeks (thereby cutting down the capacity of the plant), and the product contains undesirable free acid by reason of incomplete reaction, etc. To preclude the presence of excessive free sulfuric acid in the product, some manufacturers have reduced the amount of acid added to the phosphate rock, but this results in a product having a low available phosphoric acid or $P_2O_5$ content, and agronomists are sufficiently well informed to demand a high content of soluble phosphoric acid and are not misled by the total $P_2O_5$ content reported.

Incompletely reacted phosphate rock often indicates that the manufacturer is losing money; fluorides are lucrative by-product and incomplete reaction results in incomplete recovery of fluorides as well as incomplete conversion of phosphates to soluble form.

The well-known process of making superphosphate comprises mixing ground phosphate rock with sulfuric acid in a mixer and then dumping the mass into a den, where the material sets into a coherent, solid mass, this mass being then removed by excavators, cutting knives or other suitable equipment and then placed in large curing piles. The partly reacted material in the den is generally a hot, cement-like mass, giving the appearance of being wet, and having the undesirable characteristic or property of tenaciously adhering to the walls of the den, whether it be of wood, metal or concrete. This makes it difficult to open doors or remove walls of the den; the material adheres to cutters, knives, buckets, conveyors and other equipment and large lumps or clods must be broken up before the material is sent to the curing piles. Finally, the material often sets to concrete hardness in the curing piles and has to be literally blasted to permit its removal from the curing piles.

This invention is based upon the discovery that certain reaction-promoting agents, capable of retaining their activity in the presence of calcium ions and acid of the concentration normally employed in the acidulation of phosphate rock, greatly increase the rate of reaction, permit the formation of soluble phosphates to reach higher levels within a shorter period of time, increase the recovery of fluorine and its compounds and acids and produce a better grade of superphosphate with concomitant advantages as far as handling and plant operations are concerned, one of such advantages obtaining from the fact that the superphosphate does not set to a hard mass upon curing but instead assumes the form of a soft, readily workable means. By the use of the agents described more specifically hereafter, the superphosphate produced is not burdened with an excessive content of free sulfuric acid, unless excess is purposely introduced for use in subsequent ammoniation. The results of this invention appear to be capable of attainment with only a special class of agents, obtained by a process described in detail in copending application for United States Letters Patent Serial No. 284,041, filed April 24, 1952, by James W. Putt and entitled "Manufacture of Synthetic Detergents."

It is an object of this invention to disclose and provide a method of expediting and increasing the formation of soluble phosphates during the manufacture of superphosphate by acidulation of phosphate rock.

It is an object of this invention to disclose and provide a method of introducing reaction-promoting agents, obtained by sulfonation of naphthalene and its alkylated derivatives, into a reacting mixture of acid and phosphate rock whereby the numerous desirable results herein referred to may be surely and effectively attained.

A further object is to provide a reaction-promoting agent, adapted to form a homogeneous dispersion in aqueous solutions containing 65% to 80% sulfuric acid and being able to maintain its activity in the presence of calcium ions for use in the acidulation of phosphate rock to increase the rate of reaction and the production of soluble phosphates.

These and other objects, advantages and aspects of the invention will become apparent from the detailed description and examples given hereafter.

The acidulation of phosphate rock may be carried out with sulfuric acid, phosphoric acid, nitric acid, or mixtures of such acids. Commonly, only sulfuric acid of between about 52° and 60° Baumé (containing between about 65% and 80% $H_2SO_4$) is used. A predetermined quantity of this acid is either sprayed upon a weighed body of ground phosphate rock in a suitable mixing pan, or the acid is first placed in the pan and the rock then added. Pan mixers are commonly used, the pan revolving upon a vertical axis and stirring devices (revolving upon vertical axes in opposite direction) agitate the mass. After mixing for several minutes, a plug in the bottom of the pan is removed and scrapers facilitate the discharge of the mass into a den. The pans are generally hooded or enclosed and the fumes are sent to scrubbing towers for the recovery of fluorine generally as silicon tetrafluoride. In continuous methods, the rock and acid are fed continuously into a paddle-type mixer, discharged therefrom into a den and continuously cut out of the den. The reactions may be indicated as:

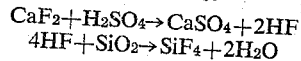

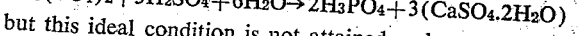

The silicon tetrafluoride generally escapes before hydrofluosilic acid is formed.

The general solubilizing reaction may be indicated as:

$Ca_3(PO_4)_2 + 3H_2SO_4 + 6H_2O \rightarrow 2H_3PO_4 + 3(CaSO_4 \cdot 2H_2O)$ but this ideal condition is not attained and monocalcium phosphate ($CaH_4(PO_4)_2$) and dicalcium phosphate ($Ca_2H_2(PO_4)_2$) are always formed. During the usual drying which takes place the monocalcium phosphate forms acid calcium pyrophosphate ($CaH_2P_2O_7$) and calcium metaphosphate, both of which are sparingly soluble and not well regarded.

The reaction-promoting agent for use in this process in accordance with this invention is an essentially non-hygroscopic, water-soluble, alkali metal salt of a sulfonated mixture of alkylated derivatives of naphthalene containing methyl groups and/or alkyl groups with 8 to 12 carbon atoms. Such mixture may also contain relatively small quantities of alkali metal salt of naphthalene sulfonate. Desirable alkyl groups are introduced by reacting the suitable aromatic hydrocarbons with olefins such as nonylene, diisobutylene and tri-isobutylene. Suitable catalysts, as for example, sulfuric acid, may be used for this purpose. The preferred reaction-promoting agent is readily soluble in water, producing free-flowing, substantially transparent solutions even at 55%–60% concentration. Properties of such solutions (which may be termed colloidal) are unaffected by filtration. The solutions are not destroyed or changed by dilute sulfuric, nitric, or phosphoric acid and stable, homogeneous colloidal suspensions are formed when the aqueous solution of the reaction-promoting agent are added to sulfuric acid, even when 80% $H_2SO_4$ is present in the final aqueous suspension. Moreover, it does not precipitate to any material extent in the presence of calcium ions; tests performed by the addition of calcium chloride to aqueous solutions of the agent show that only between 8% to 12% of the reaction-promoting agent is precipitated under the most rigorous conditions, the remaining 92%–88% maintaining its activity and effectiveness. The process by which the treating agent is produced is described in the copending application referred to hereinabove.

In carrying out the process of this invention, the reaction-promoting agent may be added to the sulfuric acid, but preferably an aqueous solution of the reaction-promoting agent is first formed and such dilution water solution is then added to the acid resulting in a mixture suitable for acidulating the phosphate rock. Ordinarily from 1600 to 2000 lbs. of 52° Bé. acid are used per ton of rock; the reagent of this invention is added at the rate of 0.25 to 1.0 lb. per ton of rock. Mixing of the acid with the phosphate rock may be carried out in the available equipment and in the usual manner, but it will be found that reaction is much more rapid and complete. The evolution of silicon tetrafluoride and hydrogen fluoride is accelerated and recovery thereof is materially increased; mixing pans can be dumped within a shorter period of time and with greater ease; the reacted mixture is homogeneous and dryer than usual in the den; it does not set up into hard unmanageable masses in the den, does not appear to stick to walls or equipment and can be removed with greater facility. The curing time is reduced very appreciably and conversion to soluble forms is much higher. The resulting superphosphate does not cake or solidify and is easily handled from curing pile to bagging for shipment.

Commercial runs, made without an agent, with the reaction-promoting agent specifically mentioned herein and with a commercial surface-active agent (alkali metal salt of sulfonated alkyl benzene, the alkyl group being largely dodecyl), have convincingly shown the beneficial results which flow from the process of this invention. Averages of many commercial runs, all other factors being the same as far as possible under plant conditions, showed that normal operations, without a reaction-promoting agent, produced a conversion of 88.9% in the material discharged from the den whereas the conversion with the reaction-promoting agent averaged 92.1%. The material from the den was dryer; average without agent was 10.47% $H_2O$, whereas the average with the agent was 9.10% $H_2O$. The commercial surface-active agent referred to herein was tried and was found incapable of producing the same results; the average moisture content, ex den, was 10.79% and the average conversion 90.5%. The improved results with the reaction-promoting agent may be due in part at least to the fact that it is highly hydrophilic and that its sulfonic acid is easily suspended in the form of myriads of fine particles throughout the body of the sulfuric acid. In addition, it may be noted that the commercial surface-active agent, because of its practically incomplete solubility in acid and inability to form homogeneous suspension therein or for other reasons, produced tarry, dark blotches in the den material.

The specific group of reaction-promoting agents defined for use in this invention, exhibit surface active characteristics, which are effectively retained in the presence of sulfuric, nitric and phosphoric acids or in the presence of free calcium ions. They quickly dissolve or disperse in the stated acids and are therefore of value in the production of nitrated phosphate rocks as well as normal superphosphate (produced with sulfuric acid) and the so-called triple phosphate.

All changes, modifications, adaptations and advantages coming within the scope of the appended claims are embraced thereby.

I claim:
1. A method of expediting and increasing the rate of formation of soluble phosphates during the manufacture of superphosphate by the acid treatment of phosphate rock, which comprises: forming an aqueous solution of a reaction-promoting agent comprising an alkali metal salt of a sulfonated mixture of naphthalene and alkylated derivatives of naphthalene, containing methyl groups and alkyl groups with 8 to 12 carbon atoms; adding said aqueous solution to sulfuric acid to produce a mixture containing between about 65% and 80% acid in which the reaction-promoting agent is adapted to form a homogeneous and fine dispersion without separation; and bringing the dispersion of sulfuric acid and reaction-promoting agent into contact with phosphate rock in quantity sufficient to introduce from about 0.25 to 1.0 lb. of agent per ton of such rock, whereby the superphosphate so obtained does not set to a hard mass during curing.

2. A method of expediting the formation of superphosphate in a soft, readily workable condition by the acid treatment and curing of phosphate rock, which comprises: forming an aqueous solution of a reaction-promoting agent composed of water-soluble, alkali metal salts of a sulfonated mixture of naphthalenes and their alkylated derivatives containing alkyl groups with 8 to 12 carbon atoms, more than 85% of said agent remaining active and in solution in the presence of calcium ions; adding said aqueous solution to sulfuric acid to produce a solution containing between about 65% and 80% acid in which the reaction-promoting agent is adapted to form a homogeneous and fine dispersion without separation; and bringing the dispersion of sulfuric acid and reaction-promoting agent into contact with phosphate rock, whereby the superphosphate so obtained does not set to a hard mass during curing.

3. A method of expediting the formation of superphosphate in a soft and workable condition by the acid treatment of phosphate rock which comprises: forming an aqueous solution of a reaction-promoting agent composed of water-soluble alkali metal salts of a sulfonated mixture of naphthalenes and their alkylated derivatives containing alkyl groups with 8 to 12 carbon atoms, more than 85% of said agent remaining active and in solution in the presence of calcium ions; adding said aqueous solution to acid to be used in the acid treatment of phosphate rock to form a homogeneous and fine dispersion of the reaction-promoting agent in such acid; and bringing the dispersion into contact with phosphate rock, whereby the superphosphate so obtained does not set to a hard mass during curing.

References Cited in the file of this patent

UNITED STATES PATENTS

| | | |
|---|---|---|
| 1,901,506 | Gunther | Mar. 14, 1933 |
| 2,213,620 | Bancroft et al. | Sept. 3, 1940 |
| 2,218,695 | Leatherman | Oct. 22, 1940 |
| 2,418,203 | Stauffer | Apr. 1, 1947 |
| 2,557,730 | Ettel | June 19, 1951 |
| 2,655,530 | Nevison | Oct. 13, 1953 |